United States Patent [19]

Miyazaki

[11] Patent Number: 5,479,209
[45] Date of Patent: Dec. 26, 1995

[54] PREPROCESSOR FOR MOVING PICTURE ENCODING

[75] Inventor: Takashi Miyazaki, Tokyo, Japan

[73] Assignee: NEC Corporation, Tokyo, Japan

[21] Appl. No.: 240,575

[22] Filed: May 11, 1994

[30] Foreign Application Priority Data

May 17, 1993 [JP] Japan ................................. 5-113565

[51] Int. Cl.⁶ .............................. H04N 7/00; H04N 7/26; H04N 7/015
[52] U.S. Cl. ......................................... 348/426; 348/400
[58] Field of Search .................................... 348/426, 469, 348/390, 384, 415–417, 409, 412, 394, 404, 407, 413, 414, 487, 608, 613, 400–402; H04N 7/26, 7/00, 7/32, 7/34, 7/56, 7/48, 7/50, 7/015

[56] References Cited

U.S. PATENT DOCUMENTS

| | | | |
|---|---|---|---|
| 5,122,875 | 6/1992 | Raychaudhuri et al. | 348/390 |
| 5,146,325 | 9/1922 | Ng | 348/384 |
| 5,231,384 | 7/1993 | Kuriacose | 348/409 |
| 5,267,334 | 11/1993 | Normille et al. | 348/409 |
| 5,287,178 | 2/1994 | Acampora et al. | 348/469 |
| 5,293,229 | 3/1994 | Iu | 348/415 |

OTHER PUBLICATIONS

ISO/IEC Recommendation CD11172-2, 1993 (E), pp. 52–53.

ISO/IEC Recommendation CD11172-2, 1993 (E), Table of Contents, pp. i–ix, 15–18, 52–53, 67–72 and 77–80.

*Primary Examiner*—Safet Metjahic
*Attorney, Agent, or Firm*—Foley & Lardner

[57] ABSTRACT

A preprocessor for re-ordering of pictures in a group of pictures to be encoded by ISO/IEC Recommendation CD11172-2 system, is provided. The preprocessor has a picture type decision unit and a delay amount decision unit to meet the flexibility of the recommended system.

6 Claims, 4 Drawing Sheets

FIG. 5

| 501 | ADDRESS | 0 | 1 | 2 | 3 | 4 | 5 | 6 |
|---|---|---|---|---|---|---|---|---|
| 502 | PTYP | I | B | B | P | B | B | P |

| 503 | ADDRESS | 0 | 1 | 2 | 3 | 4 | 5 | 6 | 7 | 8 |
|---|---|---|---|---|---|---|---|---|---|---|
| 504 | PTYP | B | B | I | B | B | P | B | B | P |

FIG. 6

| PTYP | GST | SL | DLY |
|---|---|---|---|
| I | 1 | 1 | M+1 |
| I | 0 | 0 | 1 |
| P | X | 0 | 1 |
| B | X | 2 | M+2 |

PREPROCESSOR FOR MOVING PICTURE ENCODING

BACKGROUND OF THE INVENTION

This invention relates to a preprocessor for moving picture encoding, and more particularly to a preprocessor to be inserted between a source of input pictures and a moving picture encoder designed in accordance with ISO/IEC Recommendation CD11172-2.

Usually, moving picture data are encoded for the purpose of data-compression. There are many conventional methods of data-compression for a motion color picture. For example, HVS(human visual system), MC(motion compensation), VLC(variable length coding), and DCT(frequency transformation by discrete cosine transform) are well used and well known methods. Of these well known methods, HVS and MC are briefly described. The color representation for each picture element consists of three components: Y(luminance) and two chrominance components Cb and Cr. The human visual system is most sensitive to the resolution of an image's luminance component, so the Y values are encoded in full resolution, and the two chrominance vales are, for example, averaged for each 2×2 neighbourhood picture elements for datacompression.

In MC, prediction from a preceding picture frame(or frames) is used for compression of a current picture frame. A sequence of moving pictures is composed of a series of picture frames, and in a high probability, data of a picture frame is similar to that of a preceding picture frame. Thus, data of a picture frame can be compressed by using data of a preceding picture frame.

In 1993, a Recommendation of an International Standard for the coded representation of moving pictures was issued from ISO/IEC as ISO/IEC 11172. Hereafter, this Recommendation will be called MPEG(Moving Pictures Expert Group) after the name of the group which prepared the Recommendation.

In MPEG, there are three kinds of pictures, intra-coded pictures(I-Pictures), predictive coded pictures(P-pictures), and bi-directionally predicted pictures(B-pictures). Data of a B picture are determined by interpolation of data of a preceding picture and a succeeding picture.

Thus, use of B-pictures is very efficient to obtain a high compression ratio while preserving good picture quality. But, if B-pictures are used, some re-ordering of the picture sequence is necessary before encoding. Since B-pictures are coded using bi-directional motion compensated prediction, they can only be encoded after a subsequent reference picture(an I or P-picture) has been encoded.

The present invention provides one of the best apparatus for re-ordering of the picture sequence.

SUMMARY OF THE INVENTION

Before describing objects of this invention, some embodiments of MPEG are to be described. Referring to FIG. 4, examples of picture sequences are shown. Here numerals 1–19 denote order of input pictures and alphabets I, P, B denote the three kinds of pictures. In the picture sequence 401, the pictures 1I, 2B, 3B, 4P, 5B, 6B, 7P belong to a group of pictures(abbreviated to GOP) in which 1I is the start of the group(abbreviated to GST)picture. The GST picture 1I is intra-coded, the picture 4P; is predictive coded by 1I, the picture 7P is predictive coded by 4P, the pictures 2B, 3B are interpolative coded by 1I and 4P, and the pictures 5B, 6B are interpolative coded by 4P and 7P. Double vertical bars in FIG. 4 mark the GOP boundaries.

In the GOP 401, all the B-pictures in a GOP are encoded by I and P pictures in the group. This type of GOP is called a closed GOP. GOP 402 and 403 are also closed groups.

There is another type GOP shown by GOP 404. In GOP 404, 7P in a preceding GOP 403 is necessary for encoding 8B, 9B. This type of GOP is called an open type GOP.

GOP 401, 402, and 403 are re-ordered as shown by 411, 412, 413 respectively, and GOP 404 is re-ordered as shown by 414. Encoded pictures are transmitted in these re-ordered sequence shown by 411, 412, 413, 414, . . . and decoded in this order. Then the decoded pictures are rearranged in the original order for display as shown by 401, 402, 403, 404.

There is a large degree of flexibility in the MPEG. A GOP may be of any length provided that at least one I-picture is included in each GOP. A GOP may be a closed type or an open type. Any number of B-pictures(this number is denoted by M) may be interspaced between each pair of I or P-pictures.

Therefore, an important object of this invention is to provide a preprocessor for re-ordering pictures, which is adapted to be used in this system of large degree of flexibility.

In order to achieve this object, the present invention has a picture type decision unit comprising a counter and GOP pattern tables. The counter counts number of picture input pulses delivered from a moving picture source, and is reset by reset signals from the source. Usually, a reset signal is generated at the start of a video sequence indicated by double vertical bars in FIG. 4. A GOP pattern table is stored in a memory and the count of the counter is used as an address for reading out the picture types.

By changing the modulo of the counter, and by preparing necessary types of GOP tables, the apparatus of this invention can cope with the flexibility of the MPEG system.

In a preferred embodiment of this invention, a preprocessor for moving picture encoding comprises:

a picture type decision unit for deciding picture types(P-TYP) and start of a group(GST) by picture input signals and reset signals from a moving picture source;

a delay amount decision unit for deciding delay amount by GST and PTYP delivered from the picture type decision unit;

and a picture information output unit for delivering information of each picture frame giving a respective time delay determined by the delay amount decision unit.

BRIEF DESCRIPTION OF THE DRAWINGS

Further objects, features, and advantages of this invention will become apparent from a consideration of the following description, the appended claims, and the accompanying drawings in which the same numerals indicate the same or the corresponding parts.

FIG. 5 shows examples of GOP pattern table.

FIG. 6 shows a truth table of a delay amount determination unit of FIG. 3.

DETAILED DESCRIPTION OF THE PREFERRED EMBODIMENTS

Figure 1:
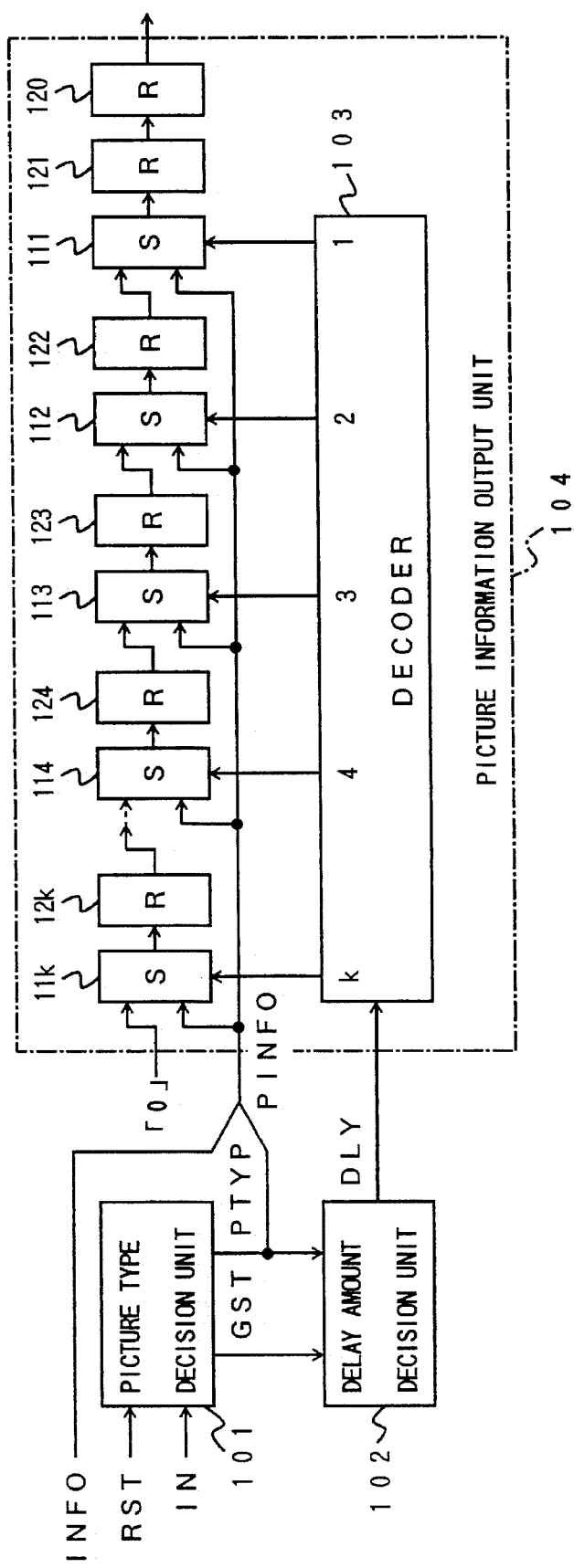
FIG. 1 shows a block diagram of an embodiment of this invention.

Referring to FIG. 1, a picture type decision unit 101 receives a reset signal RST and a picture start signal(or a signal indicating a picture input) IN from a moving picture source(not shown in the drawing), and generates start of a GOP signal GST and picture type signal PTYP.

A delay amount decision unit 102 receives the GST and PTYP signals and generates a binary coded delay amount signal DLY. The DLY signal is decoded by a decoder 103, and one terminal of the terminals 1,2,3, ... k is set at logic "H" level voltage leaving other terminals at logic "L" level voltage.

Each of the registers 120, 121, 122, 123, ... 12k stores information of a picture. Selectors 111, 112, 113, ... 11k change input of corresponding registers.

Picture information INFO is transmitted from the moving picture source, and at the start of a picture the signal IN is transmitted to the picture type decision unit. The picture type decision unit 101 generates the signal PTYP, and a signal PINFO which is a combination of the signals PTYP and INFO is connected to one input of each selector. To another input of each selector is connected an output of a register in a preceding stage.

Each selector is controlled by a corresponding output of the decoder 103. Suppose that the terminal 3 of the decoder 103 becomes "H", the signal PINFO is stored in the register 123 through the selector 113. These registers 120, 121, 122, 123, ... 12k may be FIFO(first-in-first-out) type registers, and during the time when the signal PINFO is stored in the register 123, the output of the register 122 is transferred to the register 121 through the selector 111, the output of the register 123 is transferred to the register 122 through the selector 112. To the register 12k in the first stage, blank signal "0" is input through the selector 11k.

When a complete picture denoted by the PTYP is stored in the register 123, the signal IN comes, and the signal INFO changes to a next picture. The signal DLY may change. Suppose the terminal 1 of the decoder 103 becomes "H". The signal PINFO is stored in the register 121 through the selector 111, the output of the register 122 disappears since the output is prevented by the selector 111. The output of the register 123 is stored in the register 122 through the selector 112.

Thus, re-ordering of pictures is completed in the picture information output unit 104.

Figure 2:
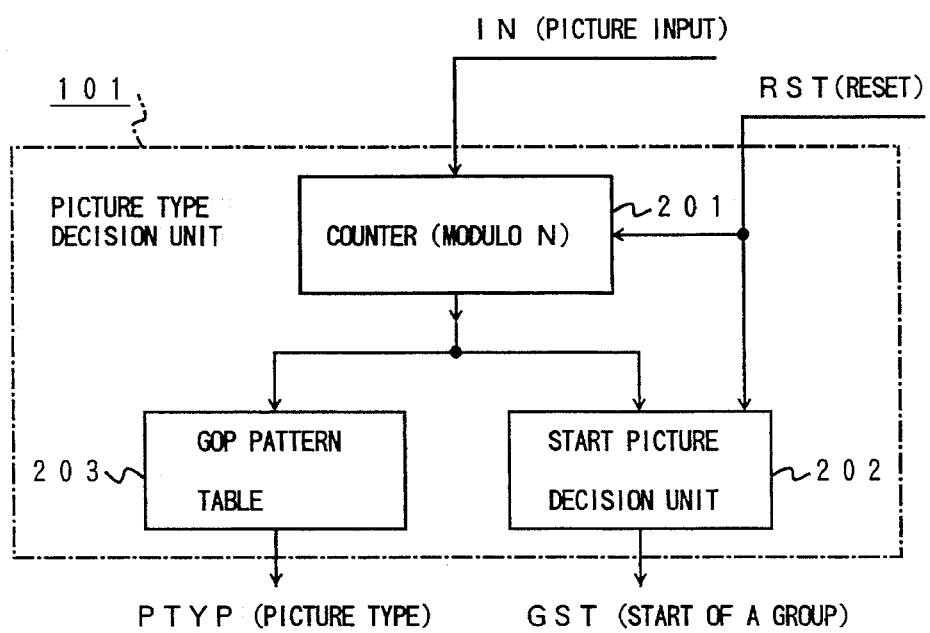
FIG. 2 shows a block diagram of a picture type decision unit of FIG. 1.

Referring to FIG. 2, the picture type decision unit 101 has a counter 201 of adjustable modulo, a GOP pattern table 203, and a start picture decision unit 202.

The modulo N of the counter 201 is to be adjusted in accordance with the total number of pictures in a GOP. For example, when a sequence of pictures is as shown by GOP 401, 402 in FIG. 4, N is to be 7(seven) and at an initialization, the counter 201 is reset to 0. When the sequence of pictures is as shown by GOP 403, 404 in FIG. 4, N is to be 9(nine) and at the initialization, the counter 201 is reset to 2(not 0), since there are no B-pictures preceding an I-picture in the GOP 403.

The counter 201 is reset to 0 at each RST signal and counts the signal IN. The start picture decision unit 202 delivers the signal GST when the count of the counter 201 comes to count 0 or RST signal is input.

Examples of the GOP pattern table 203 are shown in FIG. 5. The table may be stored in a memory and PTYP data 502, 504 are stored at address 501, 503 respectively. There may be a variety of GOP construction, and for each type of GOP, a corresponding type of the pattern table must be prepared. When the type of GOP is determined, the corresponding pattern table is used. The address 501, 503 are accessed by count of the counter 201.

The GOP pattern table as shown by 501 and 502 is used for GOPs shown by 401, 402. The GOP pattern table as shown by 503 and 504 is used for GOPs shown by 403, 404. In the GOP 403, there are no B-pictures before 1I-picture. Therefore, the counter 201 is reset to 2 at the initialization, and an I-picture is read out as PTYP by address 2 at the start of re-ordering.

Figure 3:
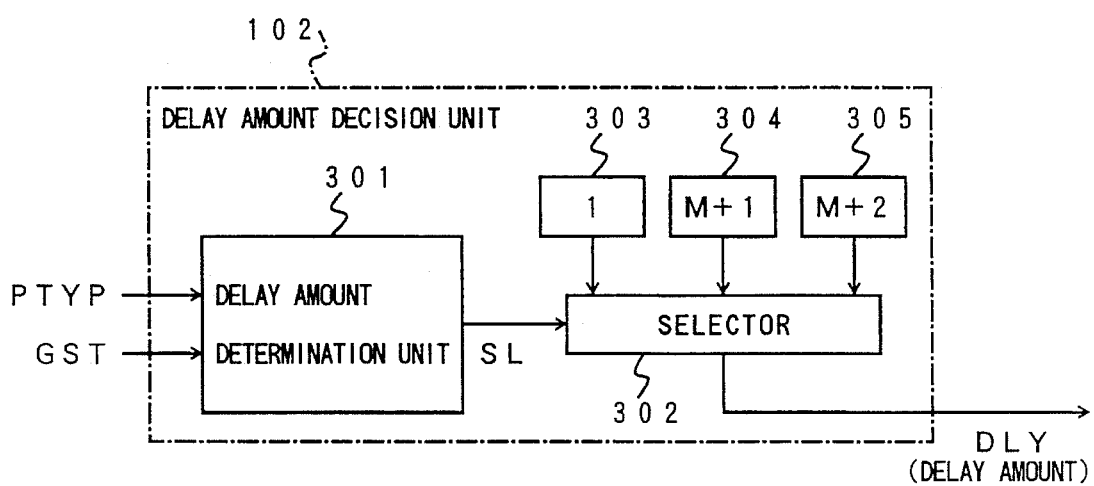
FIG. 3 shows a block diagram of a delay amount decision unit of FIG. 1.

In the delay amount decision unit 102 shown by FIG. 3, a delay amount determination unit 301 generates a selector control signal SL from signals PTYP and GST. The relation between these signals are shown in a truth table of FIG. 6. In the table, letter X means that the signal is ignored. The signal SL is given by a two bit binary signal indicating 0, 1, or 2 in the decimal number. In the selector 302, numeral value 1 is selected when the signal SL is 0, numeral value M+1 is selected when SL=1, and numeral value M+2 is selected when SL=2, as shown in FIG. 6. These numeral values which are expressed in a binary code as delay amount(or signal DLY) is delivered to the decoder 103 of FIG. 1.

Figure 4:
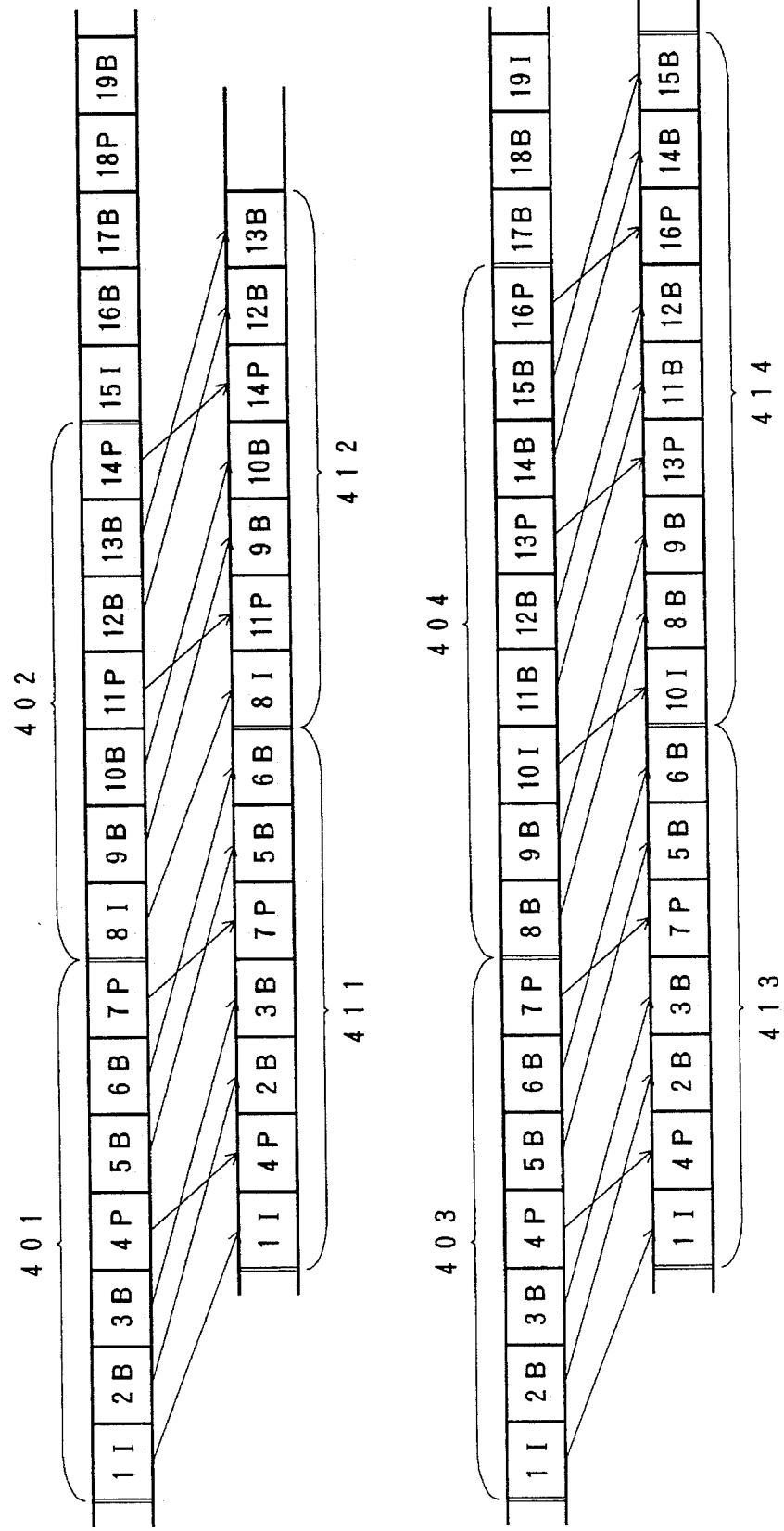
FIG. 4 shows examples of re-ordering of pictures in an embodiment of this invention.

When a sequence of pictures is to be encoded as shown by GOP 401, 402, ... in FIG. 4, N=7 is set in the counter 201, M=2 is set in the delay amount decision unit 102, and a memory shown by 501 and 502 is used as the GOP pattern table 203.

Before the start picture 1I, RST signal is delivered from the moving picture source and resets the counter 201. The start picture decision unit 202 generates GST signal, and the GOP pattern table 203 is addressed by address 0 from the counter 201 to read out data "I" as PTYP signal(FIG. 5, 501 and 502). The PTYP signal(I) and GST signal (logic "1") generates 1 as signal SL in the delay amount determination unit 301, as shown by the truth table of FIG. 6. The value 1 of the signal SL selects M+1(which is 3 when M=2) as DLY signal at the selector 302.

When DLY=3, terminal 3 of the decoder 103 becomes logic "H" level voltage, and PINFO signal which is a combination of INFO signal for picture 1I in GOP 401 and the signal PTYP(data "I") from the picture type decision unit 101 is stored in the register 123 through the selector 113.

When a complete picture of 1I in GOP 401 is stored in the register 123, signal IN indicated by a single vertical line in FIG. 4, comes to the counter 201 and increases the count of the counter by 1. GST signal is reset at the start picture decision 202, and PTYP signal of data "B" is read out from the COP pattern table 203(PTYP 502 when an address 501 is 1 in FIG. 5). For PTYP of data "B", SL signal from the delay amount decision unit 301 is 2, and DLY=M+2 at the selector 302.

Terminal 4 of the decoder 103 becomes logic "H" level voltage, and PINFO signal for the picture 2B in COP 401 is stored in the register 124. During the time when picture 2B is being stored in the register 124, PINFO of picture 1I which is previously stored in register 123 is transferred to register 122 through selector 112. In the following step, PINFO signal for picture 3B is stored in register 124, while the signal for picture 2B is transferred to register 123, and the signal for picture 1I is transferred to register 121.

Then comes picture 4P in COP 401. For a P-picture, DLY=1 as shown in FIG. 6, and PINFO of picture 4P is stored in register 121, while PINFO of picture 1I is transferred from register 121 to register 120, PINFO of picture 2B is transferred from register 123 to register 122, and PINFO 3B is transferred from register 124 to register 123.

Thus, re-ordering of pictures from COP 401, 402 . . . to COP 411, 412 . . . is completed smoothly. And it is apparent that the system of this invention as shown by FIG. 1, can be adapted for any selected type of COP, by changing values of N, M, and COP pattern table.

What is claimed is:

1. A preprocessor for moving picture encoding, comprising:

a picture type decision unit for generating picture type (PTYP) signals and start of a group of picture (GST) signals from reset signals (RST) and picture input signals (IN) provided from a moving picture source;

a delay amount decision unit for determining a delay amount based on the GST and PTYP signals delivered from said picture type decision unit; and a picture information output unit for delivering information of each picture with a respective time delay determined by said delay amount decision unit, wherein said picture information output unit includes a predetermined number of selector/register sets each including a selector having a first and second input and a register, cascaded in tandem, in which an output of a selector in a set is connected to an input of a register in the set, an output of the register in the set is connected to the first input of a selector in a succeeding set, and a picture information signal PINFO of a picture from said moving picture source is connected in parallel to the second input of each selector in the selector/register sets, a blank signal being connected to the first input of a selector in a first stage of the selector/register sets, and an output of a register in a last stage of the selector/register sets being connected directly to another register, means for controlling said selectors of said selector/register sets in which a logic "H" level voltage at a control signal input terminal of a selector connects signal PINFO to the output of the selector, and a logic "L" level voltage at said control signal input terminal of said selector connects an output of a preceding register to said output of said selector, and a decoder for generating said logic "H" level voltage at a control terminal of a selector based on said delay amount decided by said delay amount decision unit.

2. A preprocessor for moving picture encoding of claim 1, wherein said registers are FIFO(first-in-first-out) type registers.

3. A preprocessor for moving picture encoding, comprising:

a picture type decision unit for generating picture type (PTYP) signals and start of a group of picture (GST) signals from reset signals (RST) and picture input signals (IN) provided from a moving picture source;

a delay amount decision unit for determining a delay amount based on the GST and PTYP signals delivered from said picture type decision unit; and a picture information output unit for delivering information of each picture with a respective time delay determined by said delay amount decision unit, wherein said picture type decision unit includes a counter of modulo N set equal to a total number of pictures in a group of pictures which is an object of re-ordering, said counter being reset by a signal RST from said moving picture source and a count of said counter being increased by 1 at each signal IN from said moving picture source;

a start picture decision unit for generating said signal GST when said reset signal RST is received or when the count of said counter comes to zero; and a GOP (group of pictures) pattern table from which said PTYP signal is read out, addressed by the count of said counter.

4. A preprocessor for moving picture encoding of claim 3, wherein said GOP pattern table is stored in a ROM.

5. A preprocessor for moving picture encoding, comprising:

a picture type decision unit for generating picture type (PTYP) signals and start of a group of picture (GST) signals from reset signals (RST) and picture input signals (IN) provided from a moving picture source;

a delay amount decision unit for determining a delay amount based on the GST and PTYP signals delivered from said picture type decision unit; and a picture information output unit for delivering information of each picture with a respective time delay determined by said delay amount decision unit, wherein said delay amount decision unit includes a delay amount determination unit for generating a delay amount selector control signal SL from a GST signal and a PTYP signal; and a selector for selecting one of three kinds of delays 1, M+1, M+2 as a delay amount in accordance with said signal SL, where M is a natural number determined as a system parameter.

6. A preprocessor for moving picture encoding comprising:

a picture type decision unit for deciding picture types(PTYP) and start of a group of pictures(GST) by reset signals(RST) and picture input signals(IN) from a moving picture source;

a delay amount decision unit for deciding delay amount by GST and PTYP signals delivered from said picture type decision unit;

a predetermined number of sets of a selector and a register cascaded in tandem, in which output of a selector is connected to input of a register in a same set, output of a register is connected to one input of a selector in a succeeding set, and picture information signal PINFO of a picture from said moving picture source is connected in parallel to another input of all the selectors, signal 0(blank) being connected to said one input of a selector in a first stage, and output of a register in a last stage being connected directly to another register;

means for controlling said selectors in which logic "H" level voltage at a control signal input terminal of a selector connects signal PINFO to the output of the selector, and logic "L" level voltage at said control signal input terminal of said selector connects output of a preceding register to said output of said selector;

a decoder for generating said logic "H" level voltage at a control terminal of a selector determined by said delay amount decided by said delay amount decision unit.

* * * * *